US006947471B1

(12) United States Patent
Horne

(10) Patent No.: US 6,947,471 B1
(45) Date of Patent: Sep. 20, 2005

(54) METHOD FOR USING ENCODED SPREADING CODES TO ACHIEVE HIGH BIT DENSITIES IN A DIRECT-SEQUENCE SPREAD SPECTRUM COMMUNICATION SYSTEM

(75) Inventor: David M. Horne, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/002,648

(22) Filed: Jan. 5, 1998

(51) Int. Cl.[7] .............................................. H04B 1/707
(52) U.S. Cl. ...................................... 375/146; 375/140
(58) Field of Search ............................... 375/200, 206, 375/208; 364/717, 717.5

(56) References Cited

U.S. PATENT DOCUMENTS

| 4,117,271 A | * | 9/1978 | Teeter et al. ................... 380/52 |
| 4,429,310 A | * | 1/1984 | Zscheile, Jr. et al. ...... 343/13 R |
| 4,759,034 A | * | 7/1988 | Nagazumi .................... 375/200 |
| 4,912,722 A | * | 3/1990 | Carlin ......................... 375/208 |
| 4,972,480 A | * | 11/1990 | Rosen .......................... 380/46 |
| 5,315,616 A | | 5/1994 | DeLisle et al. |

FOREIGN PATENT DOCUMENTS

WO    US 98/27594    12/1998

\* cited by examiner

*Primary Examiner*—Temesghen Ghebretinsae
(74) *Attorney, Agent, or Firm*—Blakely, Sokoloff, Taylor & Zafman LLP

(57) ABSTRACT

A method for achieving high bit densities in a direct-sequence spread spectrum communication system by using encoded spreading codes. An encoded pseudo-noise code is first created. This encoded pseudo-noise code is then used to spread an information signal by modulating the information signal with the encoded pseudo-noise code. The same encoded pseudo-noise code is also used to demodulate the signal. The encoded pseudo-noise code is created by inverting one bit of a pseudo-noise code where the inverted bit corresponds to the value of the information signal.

9 Claims, 4 Drawing Sheets

METHOD FOR USING ENCODED SPREADING CODES TO ACHIEVE HIGH BIT DENSITIES IN A DIRECT-SEQUENCE SPREAD SPECTRUM COMMUNICATION SYSTEM

FIELD OF THE INVENTION

The present invention relates to the field of data communications. More particularly the invention describes a method of using encoded spreading codes to achieve high bit densities in direct sequence spread spectrum communication systems.

BACKGROUND OF THE INVENTION

Direct Sequence Spread Spectrum (DSSS) techniques rely on the use of pseudo-noise carriers, also called spreading codes, spreading sequences, code sequences and chip sequences, and a transmission bandwidth which is much wider than the minimum required to transmit the information. The transmitter spreads the information by modulating the information with a pseudo-noise spreading sequence. At the receiver, the information is despread to recover the base information. This despreading is accomplished by correlating the received, spread-modulated, signal with the spreading sequence used for the transmission. DSSS is sometimes referred to by the shorthand name "direct spread."

The modulating signal, such as a pseudo-random spreading code signal, possesses a chip rate (analogous to carrier frequency) which is much larger than the data rate of the information signal. This characteristic is required for efficient spreading. Each state of the pseudo-random spreading sequence is referred to as a chip. The spreading sequence (chip sequence) directly modulates each bit of the information signal, hence the name direct spread. Pseudo-randomness of the spreading signal is required in order to recover the original information signal. Since the spreading sequence is deterministic, it can be exactly duplicated at the receiver in order to extract the information signal. If it were truly random, extraction of the information signal via correlation receiver would not be possible.

The spreading operation causes the signal power to be depleted uniformly across the spread bandwidth. Thus, the spread spectrum signal will appear buried in noise to any receiver without the despreading signal. Consequently, it is not only difficult to jam, but is also difficult to detect its presence in any bandwidth. Any undesired signal picked up during transmission is spread by the receiver in the same way that the transmitter spread the desired signal originally. In other words, the receiver spreads undesired signals picked up during transmission, while simultaneously despreading, or demodulating, the desired information signal. Processing gain is the term used to express this interference suppression in the overall transmit/receive operation. When viewed as a transmit/receive operation, the desired signal is spread-modulated twice, giving back the original signal, while in-band interference is spread-modulated once, and thereby depleted across the full spread bandwidth.

SUMMARY OF THE INVENTION

A method for achieving high bit densities in a direct-sequence spread spectrum communication system by using encoded spreading codes. First, an encoded pseudo-noise code is created. This encoded pseudo-noise code is then used to spread a first signal by modulating the first signal with the encoded pseudo-noise code.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE INVENTION

The disclosed method utilizes the oversampled nature of spreading codes in direct sequence spread spectrum techniques to encode the spreading codes. The encoding is accomplished by altering a single chip (a single state) within the spreading sequence. This conveys an additional 'n-1' bits per symbol (length of spreading sequence), where 'n' is the log-base-2 of the spreading code length. Information capacity is greatly increased over the conventional direct-sequence spread spectrum techniques, such as the one described above, with virtually no change in transmit power. In addition, the implementation is relatively simple and produces only a slight variation in the correlation properties of theoretically ideal correlation.

The excess bandwidth inherent in spread spectrum modulation can be exploited to increase information capacity, without sacrificing the benefits of the spread spectrum techniques. The over-sampled nature of the spreading code allows additional information to be embedded within. Because each spreading code symbol is represented by a large number of chips, a change to one chip of the length 'n' spreading code has minimal impact on the overall efficacy of the underlying spread spectrum technique, while significantly increasing the information capacity over conventional direct-sequence spread spectrum techniques.

Figure 1A:
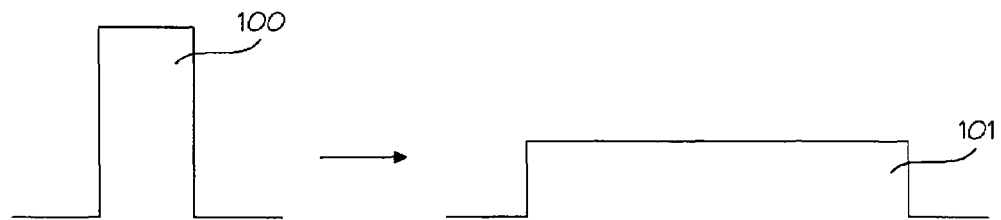
FIG. 1(a) is a diagram showing a signal being spread.
Figure 1B:
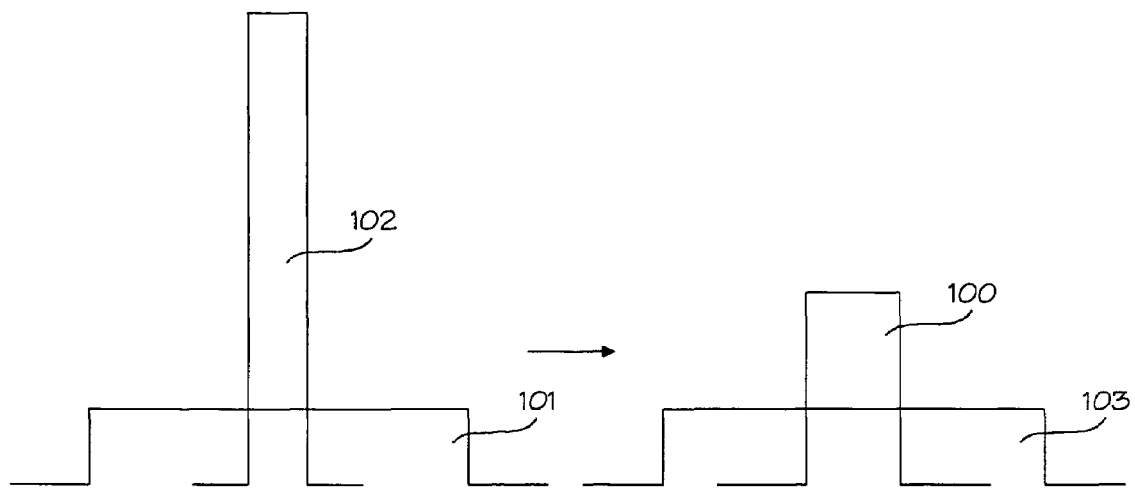
FIG. 1(b) is a diagram showing a spread signal with interference being demodulated into the original signal and noise.

FIG. 1(a) shows an example of what occurs to a signal when it is spread. Signal 100 is spread using a spreading sequence (not shown) into signal 101. As can be seen, the amplitude of the signal is decreased, while its bandwidth is expanded. By reducing the amplitude, the signal will appear indistinguishable from noise, and can only be recovered by a receiver which processes the correct spreading sequence. FIG. 1(b) shows the spread signal 101 and an interference signal 102 which has been picked up during transmission. When the spread modulated signal 101 is demodulated by using the original spreading sequence (not shown), the original signal 100 is recovered and the interference signal 102 is spread into signal 103, thereby being reduced to noise.

Figure 2A:
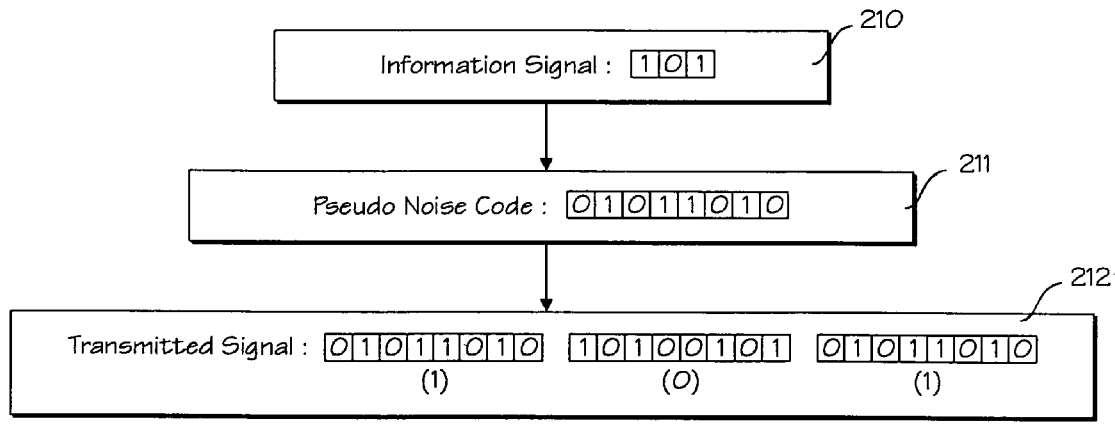
FIG. 2(a) is an exemplary prior art method of spreading signals.

FIG. 2(a) is a diagram of an exemplary prior art method of spreading a signal. An information signal 210 is modulated, using known methods, by a pseudo-noise code 211. For each '1' in the information signal, the pseudo-noise code 211 is transmitted. Whereas for each '0' in the information signal, the inverse of the pseudo-noise code 211 is transmitted. Thus, through such modulation, the signal is spread out for transmission into the transmitted signal 212. For example, if the information signal 210 consists of the bits '101' and the pseudo-noise code 211 is '01011010' then the transmitted signal 212 is '01011010 10100101 01011010.' This transmitted signal is created by '1' corresponding to the pseudo-noise code 211 ('010110101') and '0' corresponding to the inverse of the pseudo-noise code ('10100101').

Figure 2B:
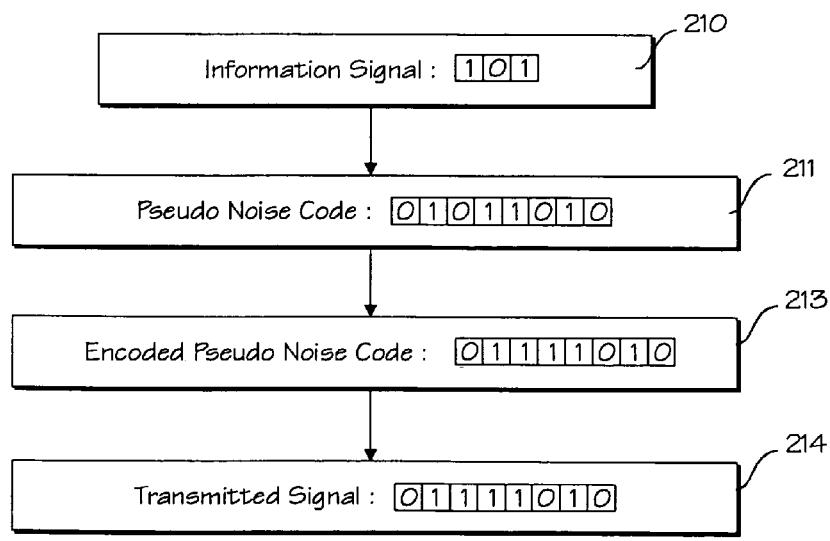
FIG. 2(b) is an exemplary method of spreading signals using an encoded pseudo-noise code.

FIG. 2(b) is a diagram of an exemplary method of spreading a signal using an encoded pseudo-noise code. As described above, the information signal 210 is again modulated by a spreading signal to create a transmitted signal 214. However, in this case, instead of using a pseudo-noise code, an encoded pseudo-noise code is used. By using an encoded pseudo-noise code, multiple bits of information can be transmitted per each pseudo-noise code instead of a single bit, as described above. The encoded pseudo-noise code is created by inverting one bit in a pseudo-noise code wherein the inverted bit of the pseudo-noise code corresponds to the value of the information signal being sent. As a trivial example, if two bits of information are to be sent per each pseudo-noise code, a four bit pseudo-noise code is required because two bits of information have a value ranging from zero to three. If the value of the information bits is 3 (the bits are '11'), then the third bit of the pseudo noise code is inverted, where the bits are numbered zero through three. The encoding operation provided by inversion of one bit of a pseudo-noise code results in high bit densities of transmitted data while still containing high correlation. In any set of non-trivial length spreading codes, inversion of one bit will have an insignificant effect on the correlation properties, therefore, even inverting one bit will still result in high correlation for these non-trivial code lengths. For example, in FIG. 2(b), the same trivial information signal 210 ('101') and pseudo-noise code 211 ('01011010') of FIG. 2(a) is used. In this case, since a binary '101' equals a numeric 5, the encoded pseudo-noise code is '01111010,' where the encoded pseudo-noise code is pseudo-noise code with the fifth bit inverted. Thus, the encoded pseudo-noise code corresponds to '101' and the transmitted signal is therefore the encoded pseudo-noise code of '01111010.'

Figure 3:
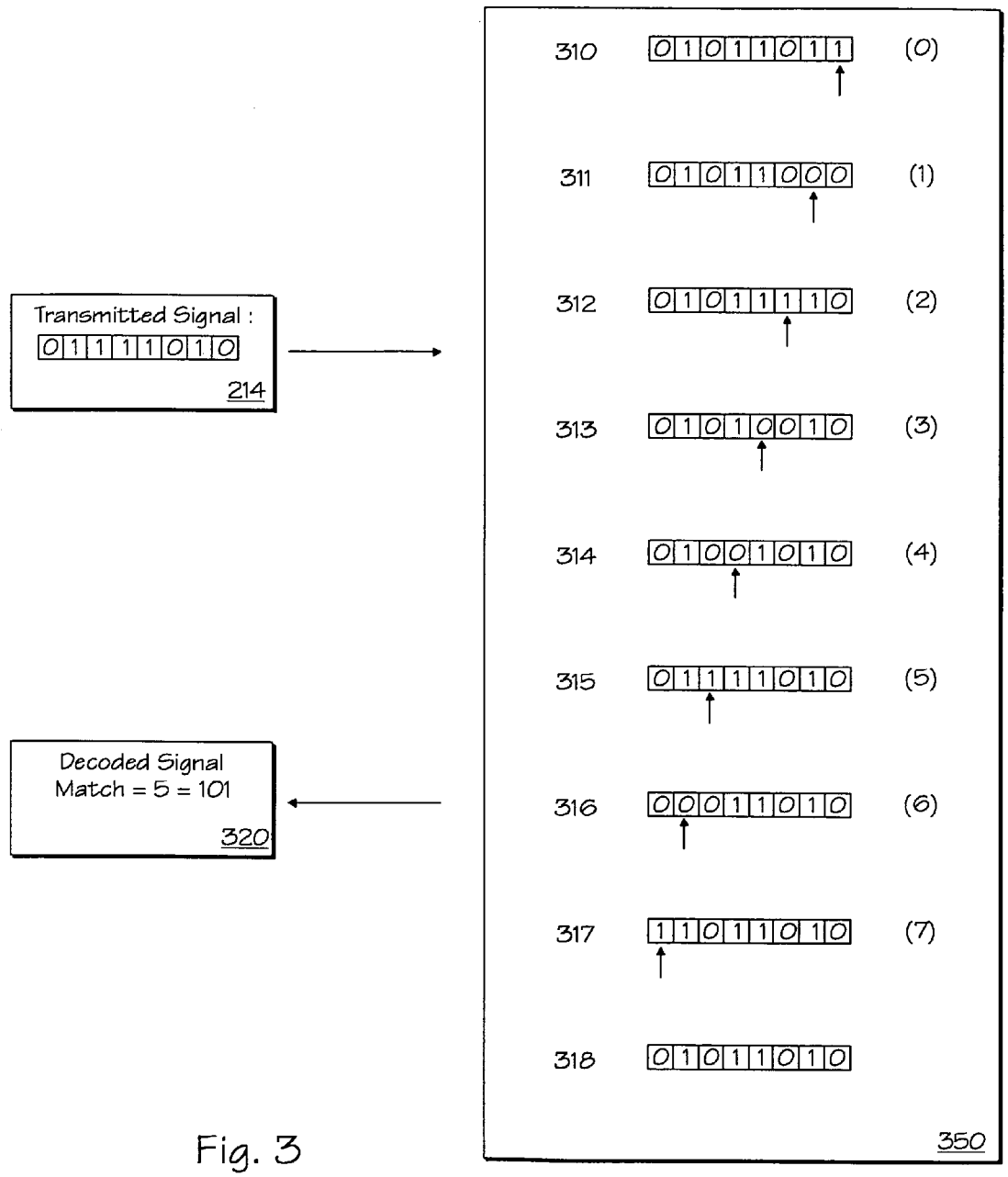
FIG. 3 is a block diagram of receiving and decoding the spread modulated signal of FIG. 2.

FIG. 3 shows the receipt and decoding of the transmitted signal. When the transmitted signal 214 from FIG. 2(b) is received, it is compared to the correlators for that pseudo-noise code 318. Each correlator is the pseudo-noise code 318 with one bit inverted where the location of the inverted bit indicates the value of the signal. The transmitted signal may be compared to the correlators simultaneously. When a match is found then the value corresponding to the correlator (which corresponds to the location in which and inverted bit was found) is read. This value is the value of the original signal. In this manner, the signal is demodulated, or despread. Using the example of the transmitted signal '01111010,' when it is compared with each correlator, it is found that it corresponds to correlator 315, where correlator 315 is pseudo-noise code 318 with the fifth bit inverted. Therefore the decoded signal 320 is equal to the numeric value '5' and in a binary signal is '101.'

In the example described above, an eight bit pseudo-noise code was used to transmit three bits of information. Of course, other values could be used. For example, to transmit 2 bits of information at a time, a four bit pseudo-noise code is required. Similarly, to transmit 4 bits of information, a 16-bit pseudo-noise code is required, to transmit 5 bits of information, a 32-bit pseudo-noise code is required, to transmit 6 bits of information, a 64-bit pseudo-noise code is required, etc.

Figure 4:
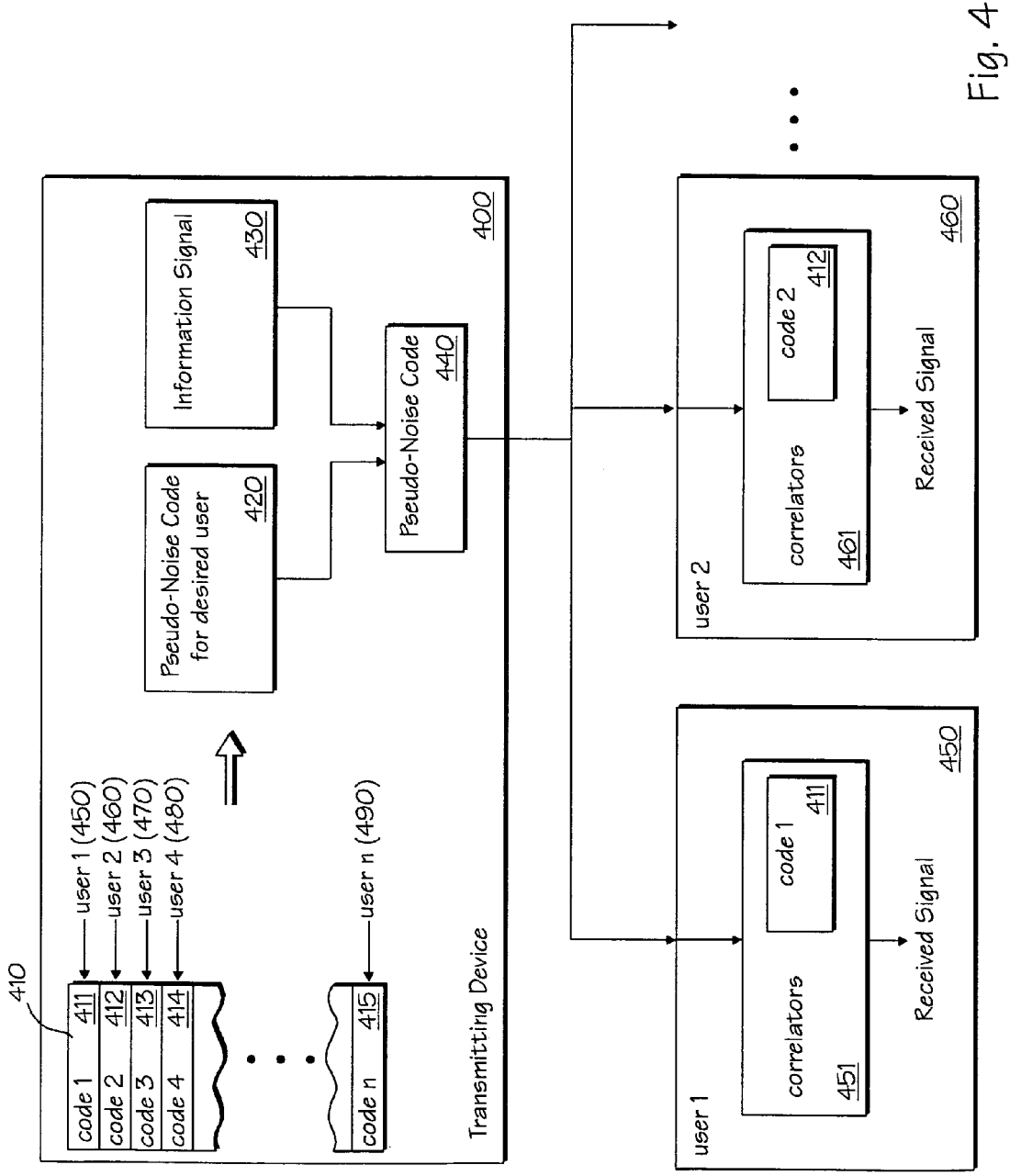
FIG. 4 is a block diagram of a multiple user system implementing the encoded spreading method of FIGS. 2 and 3.

FIG. 4 shows a block diagram implementing the above modulating and demodulating process in a multiple-user arena. The transmitting device 400 contains a table of orthogonal spreading codes 410, e.g. Walsh Codes. The use of orthogonal spreading codes allows each user to be assigned a different spreading code without any two users overlapping. For example, the first spreading code (code 1) 411, corresponds to user 1 450, the second spreading code (code 2) 412, corresponds to user 2 460, etc. down to code n 415 and user n 490. When a signal is to be sent, the pseudo noise code for the desired user 420 is chosen. The information signal 430 is then spread using encoded pseudo-noise codes 440 as described above. This signal is then transmitted. The transmitted signal is then received by the multiple users. Each user (450, 460) has correlators (451, 461) corresponding to the pseudo-noise code assigned to that user (411, 412) with one bit inverted corresponding the value of the signal, as described above. If the signal is intended for the user, then the correlators will find a match and the signal will be despread, or demodulated.

What is claimed is:

1. A method comprising:
   assigning a first pseudo-noise code to a first user of a plurality of users; and
   spreading a first signal using a first encoded pseudo-noise code generated by inverting one bit of the first pseudo-noise code, wherein the position of the one inverted bit of the first encoded pseudo-noise code corresponds to the value of the first information signal.

2. The method of claim 1 further comprising:
   storing a table of orthogonal pseudo-noise codes.

3. The method of claim 2 further wherein a second encoded pseudo-noise code located in the table corresponds to a second user.

4. The method of claim 1, further comprising generating a second encoded pseudo-noise code by inverting a second bit of the first pseudo-noise code, wherein the position of the second inverted bit of the second encoded pseudo-noise code corresponds to the value of a second signal.

5. The method of claim 1, further comprising:
   assigning a second pseudo-noise code to a second user of the plurality of users; and
   spreading a second signal using a second encoded pseudo-noise code generated by inverting one bit of the second pseudo-noise code, wherein the position of the one inverted bit of the second encoded pseudo-noise code corresponds to the value of the second signal.

6. The method of claim 1, further comprising:
   transmitting the first encoded pseudo-noise code from a transmitting device; and
   storing a table of orthogonal codes in the transmitting device.

7. A method comprising:
   assigning a first pseudo-noise code to a first user of a plurality of users; and
   generating a first encoded pseudo-noise code by inverting one bit of the first pseudo-noise code, wherein the position of the one inverted bit of the first encoded pseudo-noise code represents the value of a first information signal.

8. The method of claim 7, further comprising generating a second encoded pseudo-noise code by inverting a second bit of the first pseudo-noise code, wherein the position of the second inverted bit of the second encoded pseudo-noise code represents the value of a second information signal.

9. The method of claim 7, further comprising:
assigning a second pseudo-noise code to a second user of the plurality of users; and spreading a second information signal using a second encoded pseudo-noise code generated by inverting one bit of the second pseudo-noise code, wherein the position of the one inverted bit of the second encoded pseudo-noise code represents the value of the second information signal.

* * * * *